United States Patent [19]

Keller

[11] Patent Number: 4,606,746
[45] Date of Patent: Aug. 19, 1986

[54] METHOD OF MONITORING THE POSITION OF TWO MOVABLE SIDE PORTIONS OF A MOULD OF A GLASSWARE FORMING MACHINE

[75] Inventor: René Keller, Wettswil, Switzerland

[73] Assignee: Emhart Industries, Inc., Farmington, Conn.

[21] Appl. No.: 779,190

[22] Filed: Sep. 23, 1985

[30] Foreign Application Priority Data

Sep. 28, 1984 [GB] United Kingdom ............... 8424613

[51] Int. Cl.⁴ .............................................. C03B 9/40
[52] U.S. Cl. ......................................... 65/29; 65/158; 65/163; 65/DIG. 13
[58] Field of Search ................... 65/29, 158, 160, 163, 65/DIG. 13

[56] References Cited

U.S. PATENT DOCUMENTS

| | | | |
|---|---|---|---|
| 3,180,718 | 4/1965 | Wilhelm | 65/158 |
| 3,192,027 | 6/1965 | Wilhelm | 65/158 |
| 3,574,587 | 4/1971 | Grundy et al. | 65/158 |
| 4,342,580 | 8/1982 | Roberson | 65/29 X |
| 4,443,241 | 4/1984 | Jones | 65/158 X |
| 4,557,744 | 12/1985 | Fenton et al. | 65/158 X |

*Primary Examiner*—Arthur Kellogg
*Attorney, Agent, or Firm*—Arthur B. Moore

[57] ABSTRACT

The positions of movable side portions (12,14) of a mould are monitored to determine whether the side portions reach their mould-closed condition. Ultrasonic radiation is transmitted from a first source (22) so that it is reflected by a first of the mould portions (12) to a first detector. Ultrasonic radiation is also transmitted from a second source (24) so that it is transmitted from the second mould portion (14) to a second detector. A signal is produced which is indicative of the time taken by the radiation to travel from the first source to the first detector plus the time taken by the radiation to travel from the second source to the second detector and the signal is compared with a standard representing the expected time for the radiation travel when the side portions are in their closed condition.

5 Claims, 2 Drawing Figures

METHOD OF MONITORING THE POSITION OF TWO MOVABLE SIDE PORTIONS OF A MOULD OF A GLASSWARE FORMING MACHINE

BACKGROUND OF THE INVENTION

This invention is concerned with a method of monitoring the positions of two movable side portions of a mould of a glassware forming machine which, in the operation of the machine, are moved in opposite directions into engagement with one another so that the side portions are in a mould-closed condition thereof in which they cooperate in defining a mould cavity in which molten glass can be moulded, and are subsequently moved apart to allow removal of moulded glass. While the invention is applicable to other types of glassware forming machines, it is particularly applicable to glassware forming machines of the individual section type.

Glassware forming machines of the individual section type are well known and comprise a plurality of individual glassware forming units, called sections, which are arranged side by side to receive gobs of molten glass from a common source and to feed their output to a common conveyor. Each section has a parison mould arrangement at which gobs of molten glass are formed into parisons either by a pressing operation or by a blowing operation, a blow mould arrangement in which parisons are blown to the shape of the required container, transferring means for transferring parisons from the parison mould arrangement to the blow mould arrangement, and take-out means for removing completed containers from the blow mould arrangement. In most glassware forming machines of the individual section type, both the parison mould arrangement and the blow mould arrangement of a section comprise two movable mould side portions. These movable side portions are moved in opposite directions either linearly or arcuately about a common vertical axis into engagement with one another so that the side portions are in a mould-closed condition in which they co-operate in defining a mould cavity. In the case of a mould of a parison mould arrangement, the mould cavity defines the shape of the parison and a gob of glass is introduced into the cavity and moulded to the shape of the cavity either by a blowing or by a pressing operation. In the case of a blow mould arrangement, the cavity receives a parison and the parison is blown to the shape of the cavity thereby forming the completed container. The mould portions are subsequently moved apart to allow removal of the parison from a parison mould arrangement or the completed article from a blow mould arrangement. In the case of linearly moved side portions, the portions are mounted on supports which are moved in opposite directions along a slideway. In the case of arcuately moved side portions, the side portions are mounted on supports which are both pivotally mounted on a common vertical axis and are swung in opposite directions about said axis.

It has been recognised that it is desirable to monitor the positions of the two movable side portions of a mould of a glassware forming machine to detect whether the mould portions reach their mould-closed condition. It is possible that, in the operation of the machine, a parison or a completed container may not be removed from the mould cavity as it should be with the result that, when the side portions approach their mould-closed condition, they are prevented from reaching that condition by the presence of glass in their line of movement. This undesirable condition can cause damage to the machine when molten glass is subsequently introduced into an unclosed mould and it is desirable to detect such conditions as soon as possible. Previous attempts to monitor the positions of the two movable side portions of a mould have included mounting transducers to monitor the movement of one of the side portions. However such transducers are relatively expensive and need to be protected from the hostile environment created by the presence of molten glass so that they have to be mounted in relatively inaccessible positions on the machine. Furthermore, it is not always sufficient to monitor the position of one only of the two movable side portions since the side portions may not meet at exactly the same position in every cycle of operation of the machine. For example, arcuately moved mould portions may meet at the exact centre line of the section or slightly to one side or the other side of said centre line. Attempting to monitor the positions of both movable side portions by means of transducers increases the abovementioned problems of expense and accessibility.

It is an object of the present invention to provide a method of monitoring the positions of two movable side portions of a mould of a glassware forming machine in which the side portions are monitored by inexpensive means that is readily accessible.

BRIEF SUMMARY OF THE INVENTION

The invention provides a method of monitoring the positions of two movable side portions of a mould of a glassware forming machine which, in the operation of the machine, are moved in opposite directions into engagement with one another so that the side portions are in a mould-closed condition thereof in which they co-operate in defining a mould cavity in which molten glass can be moulded, and are subsequently moved apart to allow removal of moulded glass, the monitoring being to determine whether the mould portions reach their mould-closed condition, the method comprising transmitting ultrasonic radiation from a first source so that the radiation is reflected to a first detector from a first of the side portions or a support on which the first side portion is mounted, producing a first signal indicative of the time taken by the radiation to travel from the first source to the first detector, transmitting ultrasonic radiation from a second source so that the radiation is reflected to a second detector from a second of the side portions or a support on which the second side portion is mounted, producing a second signal indicative of the time taken by the radiation to travel from the second source to the second detector, using the first and the second signals to produce a third signal indicative of the time taken by the radiation to travel from the first source to the first detector plus the time taken by the radiation to travel from the second source to the second detector, and comparing the third signal with a standard representing the expected time for the radiation travel when the side portions are in their closed condition.

In a method in accordance with the last preceding paragraph, the monitoring is carried out by ultrasonic sources and detectors which can be relatively inexpensive and can be accessibly mounted on the glassware forming machine.

Conveniently, the first and the second signals can be produced from the phase difference between the radiation transmitted by the sources and the radiation detected by the detectors, since this phase difference gives an indication of how far the radiation has travelled between the source and the detector.

Conveniently, the radiation sources may be transceivers which also act as detectors for reflections of radiation transmitted thereby. A suitable type of transceiver is a piezoxyde ultrasonic disc. A suitable piezoxyde ultrasonic disc can be obtained from the Philipps Company under the designation PXE5.

The radiation may be transmitted along a line joining the sources, the distance travelled by the radiation used to calculate the distance between each source and the associated side portion, the sum of these distances subtracted from a distance between the sources, and the result compared with the diameter of the mould when in its closed condition. This enables a direct comparison between the diameter of the mould and the distance between the points at which the ultrasonic radiation is reflected.

Conveniently, the sources may emit a continuous series of pulses of ultrasonic radiation and the first and the second signals may be produced for each pulse. The third signal is only produced and the comparison only carried out when both the first and the second signals are constant for a predetermined number of pulses. The constancy of the third signal indicates that the mould portions are stationary and it is at this time that it is important to determine whether they are in their mould closed condition.

BRIEF DESCRIPTION OF THE DRAWINGS

There now follows a detailed description, to be read with reference to the accompanying drawings of a method of monitoring the positions of two movable side portions of a mould of a glassware forming machine which is illustrative of the invention. It is to be understood that the illustrative method has been selected for description by way of example and not of limitation of the invention.

In the drawings.

DETAILED DESCRIPTION OF PREFERRED EMBODIMENT OF THE INVENTION

Figure 1:
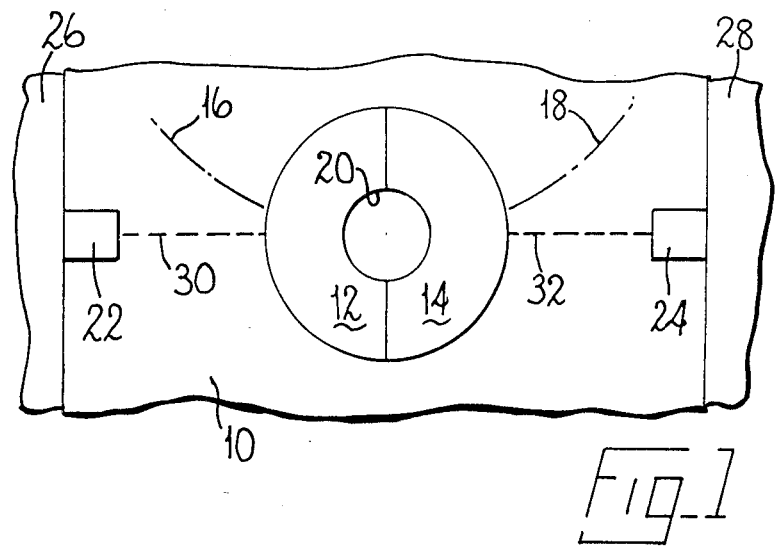
FIG. 1 is a diagrammatic plan view of a portion of a section of a glassware forming machine of the individual section type.

The illustrative method is carried out on the section 10 of a glassware forming machine of the individual section type which is shown in FIG. 1. The illustrative method is a method of monitoring the positions of two movable side portions 12 and 14 of a mould of the section 10 which, in the operation of the machine, are moved in opposite directions along arcuate paths 16 and 18 respectively into engagement with one another. The side portions 12 and 14 are, thus, moved into a mould-closed condition thereof (shown in FIG. 1) in which they co-operate in defining a mould cavity 20 in which molten glass can be moulded. The mould portions 12 and 14 are subsequently moved apart by moving them in the opposite directions along the paths 16 and 18 respectively to allow removal of molten glass from the mould cavity 20. To enable them to be moved along the paths 16 and 18, the mould portions 12 and 14 are mounted on arms (not shown) which are pivotally mounted on a common vertical axis. The method of moving the mould portions 12 and 14 and their construction is conventional and well known to those skilled in the art.

The illustrative method is to determine whether the mould portions 12 and 14 reach their mould-closed condition. In the illustrative method a first transceiver 22 and a second transceiver 24 are mounted on side frame members 26 and 28 respectively of the section 10. The transceivers 22 and 24 both comprise a piezoxyde ultrasonic disc which when energised emits ultrasonic radiation and is also able to detect ultrasonic radiation. The transceivers 22 and 24 are aligned with one another on opposite sides of the mould formed by the mould portions 12 and 14 so that, when the mould portions 12 and 14 reach their mould-closed condition at the centre line of the section 10, the line joining the transceivers 22 and 24 passes through the centre of the mould cavity 20. The transceivers 22 and 24 are mounted at the same height, this height being such that radiation emitted by the transceivers 22 and 24 passes above the aforementioned support arms of the mould portions 12 and 14 and is reflected by an upper portion of each mould portion 12 and 14. However, in modifications of the illustrative method, the transceivers 22 and 24 may be mounted so that their radiation is reflected by the aforementioned support arms.

The illustrative method comprises transmitting ultrasonic radiation from a first source provided by the transceiver 22 along a line 30 so that the radiation is reflected back along the line 30 by the side portion 12 to the transceiver 22 which provides a first detector. Thus, the radiation transmitted by the transceiver 22 is reflected to a detector, also provided by the transceiver 22, from a first of the side portions 12. In similar manner, the illustrative method also comprises transmitting ultrasonic radiation along a line 32 from a second source provided by the transceiver 24 so that the radiation is reflected to a second detector also provided by the transceiver 24 from a second 14 of the side portions.

Figure 2:
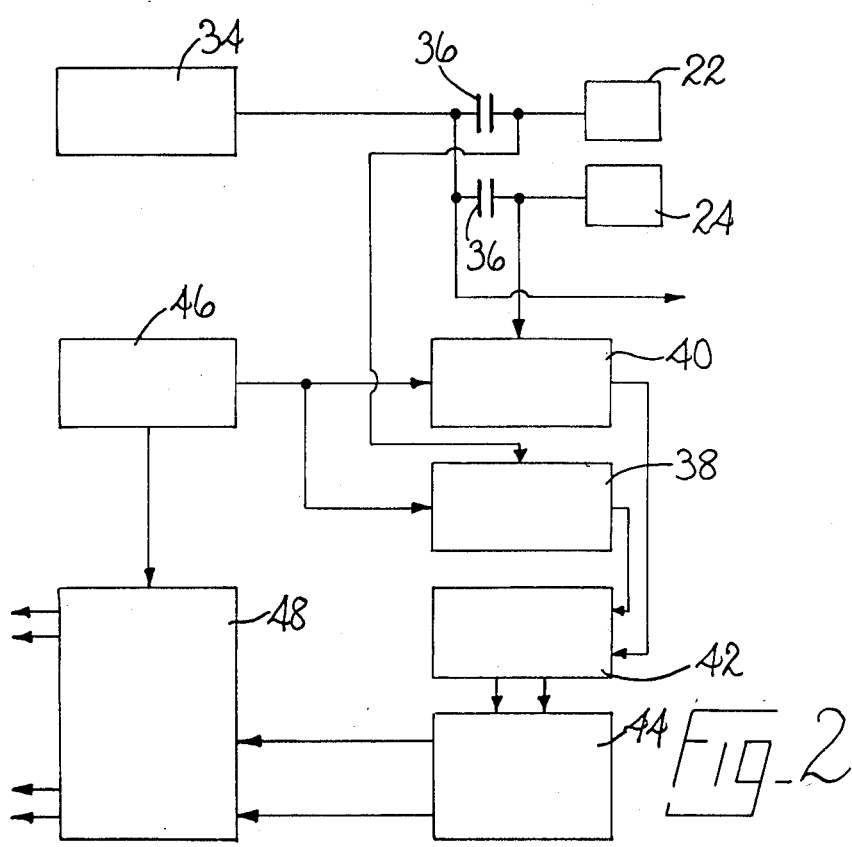
FIG. 2 is a diagrammatic view of an electronic circuit used in carrying out the illustrative method.

FIG. 2 illustrates the electrical connections to the transceivers 22 and 24. A blip oscillator 34 is connected to the transceivers 22 and 24 via capacitors 36. The oscillator 34 provides a continual series of pulses to the transceivers 22 and 24 causing them to emit a continuous series of ultrasonic pulses along the lines 30 and 32 respectively. The transceiver 22 is also connected to an analog switch 38 and the transceiver 24 is also connected to an analog switch 40. The analog switches 38 and 40 act to pass the signals they receive from the transceivers 22 and 24 to an amplifier 42 which in turn passes the amplified signals to a microprocessor 44. The analog switches 38 and 40 are also connected to a firing order controller 46 which is connected to a multiplexer 48 which also receives an output from the microprocessor 44.

In the illustrative method, the firing order controller 46 acts to switch the analog switches 38 and 40 so that at appropriate times in the cycle of operation of a glassware forming machine, the signals of the switches 38 and 40 are passed via the amplifier 42 to the microprocessor 44. The microprocessor 44 thus receives two signals which respectively indicate the signals from the transceivers 22 and 24. The microprocessor produces a first signal indicative of the time taken by the radiation produced by the transceiver 22 to travel from the transceiver 22 and back thereto. This signal is produced by determining the phase difference between the radiation transmitted by the transceiver 22 and the radiation detected thereby. The microprocessor 44 also produces a second signal indicative of the time taken by the radiation to travel from the transceiver 24 and back thereto, this signal also being produced from the phase difference between the radiation transmitted by the transceiver 24 and the radiation detected thereby. The microprocessor 44 uses the first and the second signals to produce a third signal indicative of the time taken by the radiation to travel from the transceiver 22 and back thereto plus the time taken by the radiation to travel from the transceiver 24 and back thereto. The microprocessor then compares the third signal with a standard representing the expected time for the radiation travel when the side portions are in their closed condition. Effectively, the microprocessor 44 calculates the distance between the transceiver 22 and the mould portion 12 and the distance between the transceiver 24 and the mould portion 14, subtracts the sum of these distances from the distance between the transceivers 22 and 24 and compares the result with the diameter of the mould formed by the side portions 12 and 14 when in their closed condition. This comparison gives a valid result whether the mould portions 12 and 14 have come into engagement exactly on the centre line of the section 10 or slightly to one side thereof. In order to reduce the number of operations carried out by the microprocessor, the microprocessor calculates the first and the second signals for each pulse received from the transceivers 22 and 24 but only produces the third signal and carries out the comparison when both the first and the second signals are constant for a predetermined number of pulses. This condition occurs when the mould portions 12 and 14 are stationary so that the time taken for radiation to travel from the transceivers 22 and 24 and back thereto is constant. This constant time indicates that the mould portions have reached their mould closed condition or have come to a halt without reaching said mould closed condition.

The ultrasonic transceivers used in the illustrative method are relatively inexpensive and as they are mounted away from the operating parts of the section 10 are accessible for maintenance and/or replacement.

I claim:

1. A method of monitoring the positions of two movable side portions of a mould of a glassware forming machine which, in the operation of the machine, are moved in opposite directions into engagement with one another so that the side portions are in a mould-closed condition thereof in which they co-operate in defining a mould cavity in which molten glass can be moulded, and are subsequently moved apart to allow removal of moulded glass, the monitoring being to determine whether the mould portions reach their mould-closed condition, the method comprising transmitting ultrasonic radiation from a first source so that the radiation is reflected to a first detector from a first of the side portions or a support on which the first side portion is mounted, producing a first signal indicative of the time taken by the radiation to travel from the first source to the first detector, transmitting ultrasonic radiation from a second source so that the radiation is reflected to a second detector from a second of the side portions or a support on which the second portion is mounted, producing a second signal indicative of the time taken by the radiation to travel from the second source to the second detector, using the first and the second signals to produce a third signal indicative of the time taken by the radiation to travel from the first source to the first detector plus the time taken by the radiation to travel from the second source to the second detector, and comparing the third signal with a standard representing the expected time for the radiation travel when the side portions are in their closed condition.

2. A method according to claim 1, wherein the first and the second signals are produced from the phase difference between the radiation transmitted by the sources and the radiation detected by the detectors.

3. A method according to claim 1, wherein the radiation sources are transceivers which also act as detectors for reflections of radiation transmitted thereby.

4. A method according to claim 1, wherein the radiation is transmitted along a line joining the sources, the distance travelled by the radiation is used to calculate the distance between each source and of the associated side portion, the sum of these distances is subtracted from the distance between the sources, and the result is compared with the diameter of the mould when in its closed condition.

5. A method according to claim 1, wherein the sources emit a continuous series of pulses of ultrasonic radiation and the first and the second signals are produced for each pulse, the third signal being produced and the comparison carried out only when both the first and the second signals are constant for a predetermined number of pulses.

* * * * *